No. 608,864. Patented Aug. 9, 1898.
J. JAQUET.
FLUID RECEPTACLE.
(Application filed June 14, 1897.)
(No Model.)
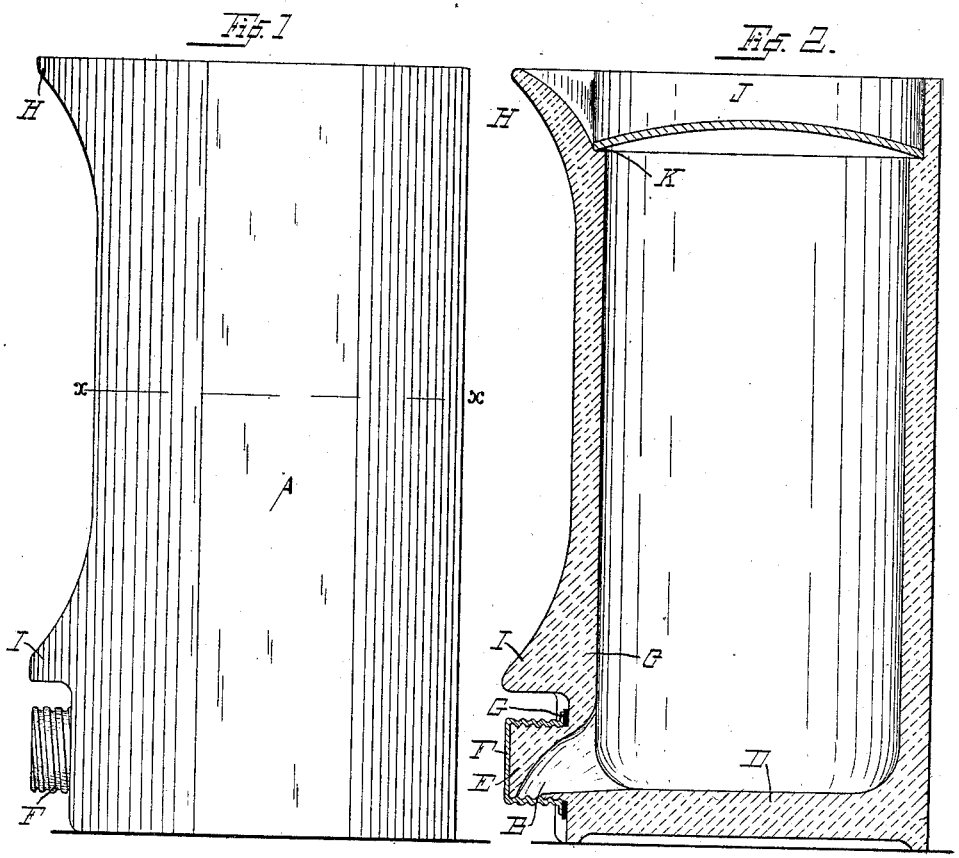
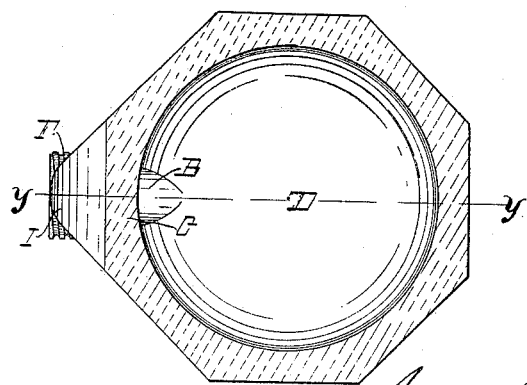
Witnesses.
Inventor.
Jules Jaquet
By Erwin Wheeler & Wheeler
Attorneys.

UNITED STATES PATENT OFFICE.

JULES JAQUET, OF MILWAUKEE, WISCONSIN, ASSIGNOR OF ONE-HALF TO HARRY HOOKER, OF SAME PLACE.

FLUID-RECEPTACLE.

SPECIFICATION forming part of Letters Patent No. 608,864, dated August 9, 1898.

Application filed June 14, 1897. Serial No. 640,730. (No model.)

*To all whom it may concern:*

Be it known that I, JULES JAQUET, a citizen of the United States, residing at Milwaukee, in the county of Milwaukee and State of Wisconsin, have invented new and useful Improvements in Fluid-Receptacles, of which the following is a specification.

My invention relates to improvements in fluid-receptacles; and it pertains more especially to that class which is used for delivering milk in small quantities to the retail trade.

The object of my invention is to provide a milk can or receptacle by which, if desired, the milk may be drawn off without removing or disturbing the cream and the milk and cream be thus easily and effectively separated from each other without the liability of being mixed together, as is the case when the same is poured in the usual manner from the mouth of the receptacle.

The construction of my device is further explained by reference to the accompanying drawings, in which—

Figure 1 represents a side view. Fig. 2 is a vertical section drawn on line Y Y of Fig. 3, and Fig. 3 is a horizontal section drawn on line X X of Fig. 1.

Like parts are referred to by the same reference-letters throughout the several views.

A represents the receptacle proper, which is preferably formed of glass or similar material, with interior cylindrical walls and exterior angular walls, in a single piece. The lower end of the receptacle A is provided with a discharge-duct B, formed through the vertical side wall C, near the bottom D of the receptacle. The discharge end of the duct B terminates downwardly through the screw-threaded projection E. The duct B is closed by a screw-cap F, which cap is provided with an elastic seat or packing G, which as said cap is screwed down firmly against it forms a tight joint which prevents the escape of the contents.

The front side of the receptacle is provided with outward-projecting flanges or shoulders H and I, located in line one above the other, as shown in Figs. 1 and 2. The upper flange H forms a pouring-spout by which the contents of the receptacle is more conveniently controlled. The flange I projects outward in close proximity to the lower discharge-duct and serves as a protecting-shield to the discharge-duct.

The mouth of the receptacle is adapted to be closed by a circular disk of cardboard or other equivalent material J, which forms a cover for the receptacle. It is obvious that the discharge-duct may be wholly or partially opened without removing the cap or cover from said outward projection, whereby the discharge of the contents of the receptacle may be regulated.

The upper end of the receptacle is provided with an annular shoulder K for the reception of the cover J, which cover is held in place by its own elasticity.

Having thus described my invention, what I claim as new, and desire to secure by Letters Patent, is—

1. As a new article of manufacture a fluid-receptacle having at its lower extremity a downward discharge-duct formed through a screw-threaded horizontal projection located outside of the vertical walls of such receptacle provided with a screw-threaded fluid-retaining cap or cover, adapted to close said discharge-duct and to be turned back and said duct to be wholly or partially opened without removing said cap or cover, whereby the discharge of the contents of said receptacle may be regulated and controlled, substantially as and for the purpose specified.

2. As a new article of manufacture a fluid-receptacle having at its lower extremity a downward discharge-duct, formed through a screw-threaded horizontal projection located outside of the vertical walls of such receptacle, provided with a screw-threaded fluid-retaining cap or cover, adapted to close said discharge-duct and to be turned back and said duct to be wholly or partially open without removing said cap or cover whereby the discharge of the contents of the receptacle may be regulated, said receptacle being provided at its upper end with an annular flange for the reception of an inclosing cover substantially as and for the purpose specified.

3. As a new article of manufacture a fluid-receptacle having at its lower extremity a downward discharge-duct formed through a screw-threaded horizontal projection located outside of the vertical walls of said receptacle provided with a screw-threaded fluid-retaining cap or cover adapted to close said discharge-duct and to be turned back and said duct to be wholly or partially opened without removing said cap or cover, whereby the discharge of the contents of the receptacle may be regulated, said receptacle being provided with an annular flange at its upper end for the reception of an inclosing cover; an outward-projecting flange or bearing located above and adapted to serve as a shield to said discharge-duct and an outward projection at the opposite end of said receptacle adapted to serve as a pouring-spout when the cover of said receptacle is removed, all substantially as and for the purpose specified.

In testimony whereof I affix my signature in the presence of two witnesses.

JULES JAQUET.

Witnesses:
JAS. B. ERWIN,
L. C. WHEELER.